United States Patent
Wilson

(10) Patent No.: US 10,234,010 B2
(45) Date of Patent: Mar. 19, 2019

(54) AXLE CARRIER FORMED FROM A METAL MATRIX COMPOSITE

(71) Applicant: GM GLOBAL TECHNOLOGY OPERATIONS LLC, Detroit, MI (US)

(72) Inventor: William J. Wilson, Commerce, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 154 days.

(21) Appl. No.: 15/242,037

(22) Filed: Aug. 19, 2016

(65) Prior Publication Data

US 2018/0051787 A1 Feb. 22, 2018

(51) Int. Cl.
*F16H 48/08* (2006.01)
*F16H 57/032* (2012.01)
*F16H 48/40* (2012.01)
*F16H 57/037* (2012.01)

(52) U.S. Cl.
CPC ........... *F16H 48/40* (2013.01); *F16H 57/032* (2013.01); *F16H 57/037* (2013.01); *F16H 48/08* (2013.01); *F16H 2048/405* (2013.01)

(58) Field of Classification Search
CPC .................... F16H 48/00–2048/426; F16H 57/00–2057/128
See application file for complete search history.

(56) References Cited

U.S. PATENT DOCUMENTS

| | | | |
|---|---|---|---|
| 5,509,862 A * | 4/1996 | Sherman | F16H 1/12 475/230 |
| 6,623,867 B2 * | 9/2003 | Crocco | B22D 19/14 428/539.5 |
| 9,284,981 B2 * | 3/2016 | Kia | F16C 33/30 |
| 2004/0060384 A1 * | 4/2004 | Guo | F16H 48/08 74/607 |

* cited by examiner

Primary Examiner — Ramya P Burgess
Assistant Examiner — Lillian T Nguyen
(74) Attorney, Agent, or Firm — Cantor Colburn LLP

(57) ABSTRACT

An axle carrier includes a housing having an outer surface, an inner surface defining an interior portion, a first axle support member, and a second axle support member. The body is formed from a first material. A gear carrier is arranged within the interior portion. The gear carrier is formed from a second material. The first material comprises a metal matrix composite having a coefficient of thermal expansion (CTE) that substantially matches a CTE of the second material.

16 Claims, 2 Drawing Sheets

AXLE CARRIER FORMED FROM A METAL MATRIX COMPOSITE

FIELD OF THE INVENTION

The subject invention relates to the art of vehicles, and more particularly, to a vehicle axle carrier formed from a metal matrix composite.

BACKGROUND

Many vehicles include a differential gear set housed in a gear carrier and surrounded by an axle carrier. The axle carrier also supports first and second axles that operatively connect with the differential gear set. Each of the first and second axles extends through passages formed in the axle carrier. Each of the first and second axles is supported by corresponding first and second bearings. During operation, the axle carrier may expand due to exposure to heat generated by the differential gear set and rotating axles. Likewise, the gear carrier may expand due to heat generated by the differential gear set and rotating axles.

The rate of expansion of the gear carrier and the rate of expansion of the axle carrier differ. As such, the first and second bearings are generally installed with a pre-load. The pre-load accommodates differing rates of expansion of the gear carrier and the axle carrier. However, while effective at maintaining desired clearances during expansion, the pre-load reduces an overall mechanical efficiency and operational life of the first and second bearings. Accordingly, it is desirable to provide an axle carrier formed from a material that precludes the need to pre-load installed bearings.

SUMMARY OF THE INVENTION

In accordance with an aspect of an exemplary embodiment, an axle carrier includes a housing having an outer surface, an inner surface defining an interior portion, a first axle support member, and a second axle support member. The body is formed from a first material. A gear carrier is arranged within the interior portion. The gear carrier is formed from a second material. The first material comprises a metal matrix composite having a coefficient of thermal expansion (CTE) that substantially matches a CTE of the second material.

In accordance with another aspect of an exemplary embodiment, a vehicle includes a chassis, a body supported by the chassis, a power source arranged in the body and supported by the chassis, a transmission operatively coupled to the power source and supported by the chassis, and an axle carrier operatively connected to the transmission through a driveshaft. The axle carrier includes a housing having an outer surface, an inner surface defining an interior portion, a first axle support member, and a second axle support member. The body is formed from a first material. A gear carrier is arranged within the interior portion, the gear carrier is formed from a second material. The first material comprises a metal matrix composite having a coefficient of thermal expansion (CTE) that substantially matches a CTE of the second material.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
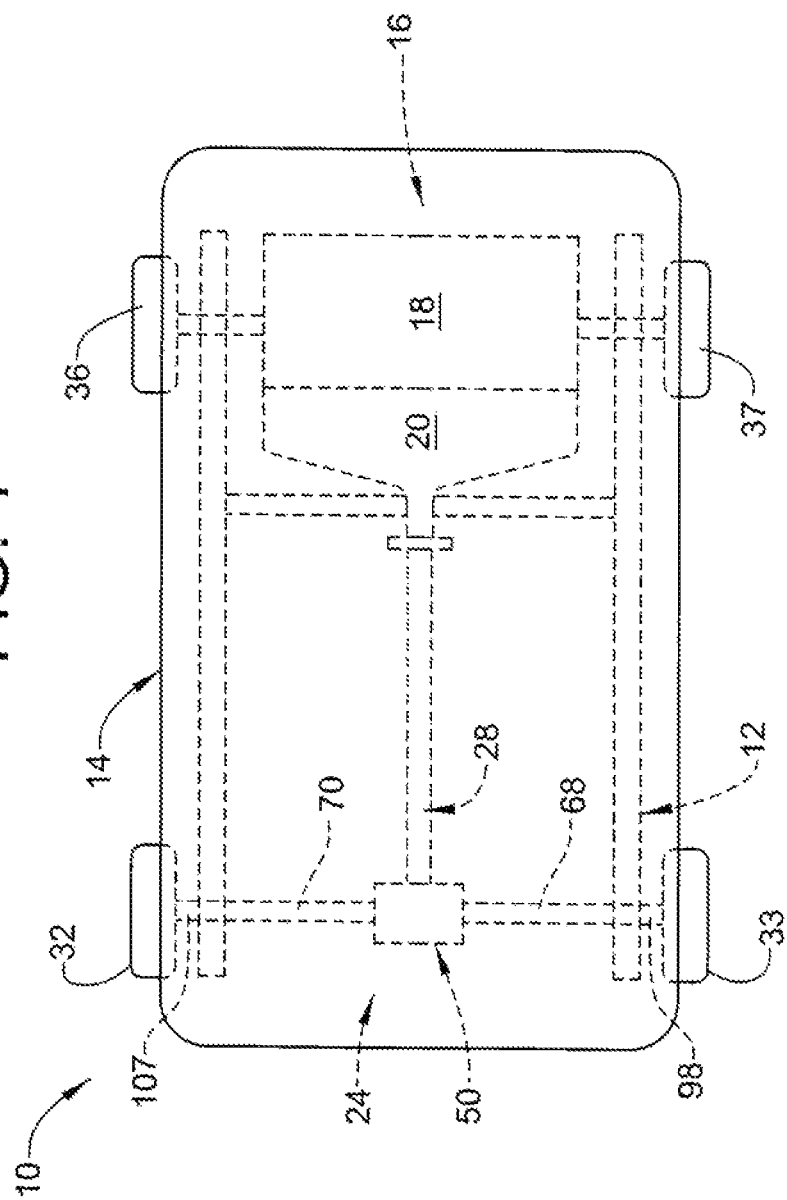
FIG. 1 is a schematic view of a vehicle including an axle carrier, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a chassis 12 that supports a body 14. Vehicle 10 also includes a power source 16 supported by chassis 12. Power source 16 may take the form of an internal combustion (IC) engine 18. Of course, it should be understood that power source 16 may take on other forms including electric motors, hybrid electric/IC engines and the like and should not be considered as being limited to IC engines. Power source 16 is operatively coupled to a transmission 20 that delivers power from power source 16 to an axle carrier 24 through a driveshaft 28. As will be detailed more fully below, axle carrier 24 is mechanically linked to first and second rear wheels 32 and 33. First and second front wheels 36 and 37 may be independently supported by chassis 12.

Figure 2:
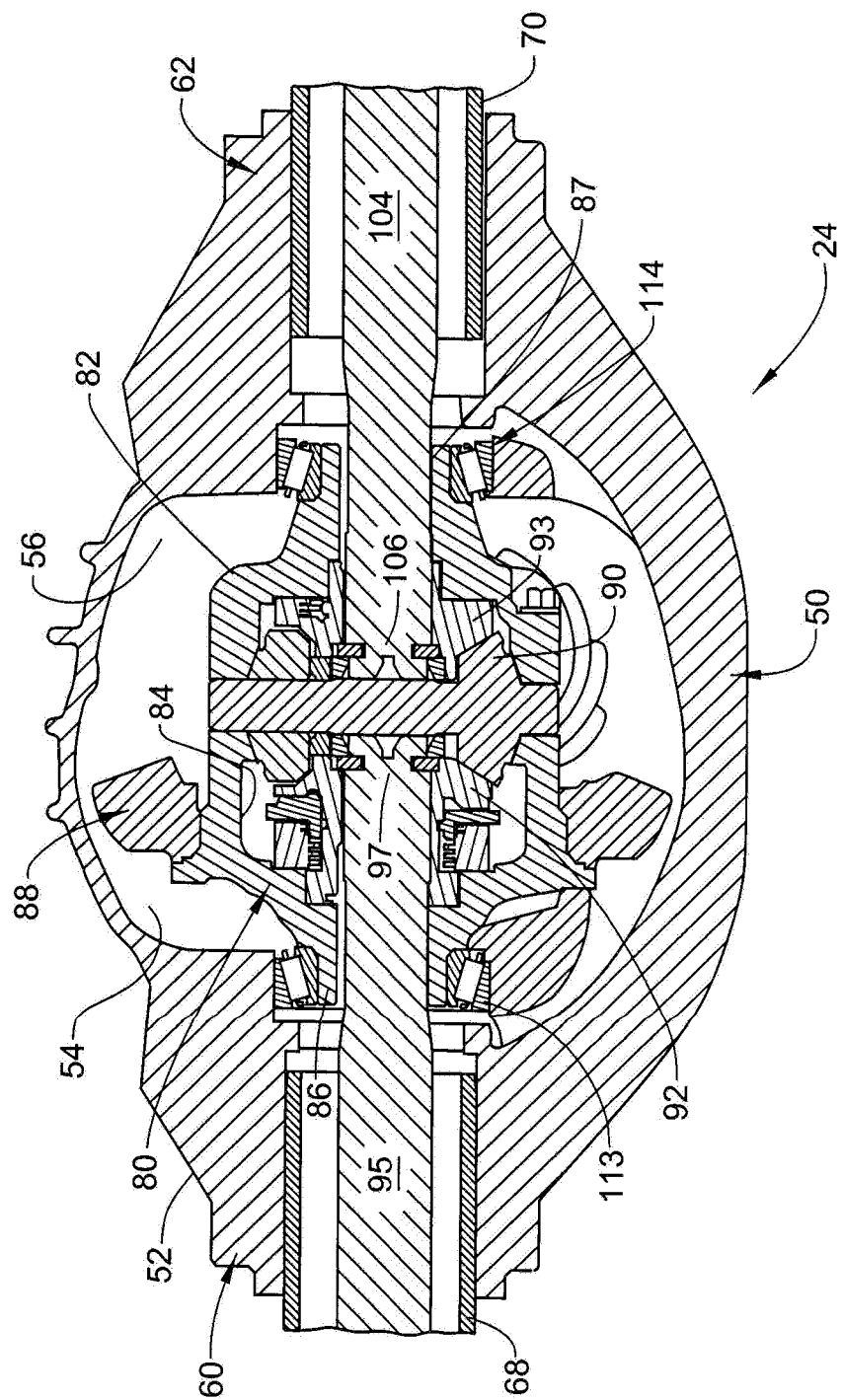
FIG. 2 depicts the axle carrier of FIG. 1.

As seen in FIG. 2, axle carrier 24 includes a housing 50 having an outer surface 52 and an inner surface 54 that defines an interior portion 56. Housing 50 also includes a first axle support member 60 and a second axle support member 62. First axle support member 60 may receive a first axle tube 68 that extends from housing 50 to chassis 12. Second axle support member 62 may include a second axle tube 70 that extends from housing 50 to chassis 12. Interior portion 56 may house a gear carrier 80 which, as will be detailed more fully below, transmits energy from power source 16 to first and second rear wheels 32 and 33.

In accordance with an aspect of an exemplary embodiment, gear carrier 80 may be formed from iron (Fe) or alloys thereof having a first coefficient of thermal expansion (CTE) and includes an outer surface portion 82 and an inner surface portion 84. Gear carrier 80 includes a first support element 86 and an opposing second support element 87. Outer surface portion 82 supports a ring gear 88 and inner surface portion 84 surrounds, at least in part, a differential gear set 90 including at least a first side gear 92 and a second side gear 93. Ring gear 88 may operatively connect with a pinion (not shown) driven by driveshaft 28. Rotation of ring gear 88 imparted by the pinion is transmitted to differential gear set 90.

A first axle 95 may extend through first axle tube 68. First axle 95 includes a first end section 97 connected to first side gear 92 and a second end section 98, FIG. 1, connected to first rear wheel 32. A second axle 104 may extend through second axle tube 70. Second axle 104 includes a first end section 106 that connects with second side gear 93 and a second end section 107 that connects with second rear wheel 33. A first bearing 113 is mounted in interior portion 56 at first axle support member 60 and a second bearing 114 is mounted in interior portion 56 at second axle support member 62. First bearing 113 is coupled to first support element 86 of gear carrier 80 and first axle support member 60. Second bearing 114 is coupled to second support element 87 of gear carrier 80 and second axle support member 62. First and second bearings 113 and 114 rotationally support gear carrier 80 within housing 50.

In accordance with an exemplary embodiment, axle carrier 24 is formed from a metal matrix composite having a second coefficient of thermal expansion (CTE) that substantially matches the first CTE of gear carrier 80. Substantially aligning the second CTE of axle carrier 24 with the first CTE of gear carrier 80 avoids the need to apply a pre-load to first and second bearings 113 and 114. More specifically, during operation, axle carrier 24 and gear carrier 80 are exposed to elevated operating temperatures. The elevated operating temperature can cause both axle carrier 24 and gear carrier 80 to thermally expand. Substantially matching the first CTE and the second CTE maintains a desired positioning of first and second bearings 113 and 114 without applying an initial preload, or if a preload is applied, that preload is less than existing designs. For example, the metal matrix composite carrier in accordance with exemplary embodiments may only employ a pre-load of from 2-5 kN, if at all.

In accordance with an aspect of an exemplary embodiment, the metal matrix composite forming axle carrier 24 includes an amount of a base metal such as Aluminum (Al). It should be understood that the particular type of base metal may vary. In accordance with another aspect of an exemplary embodiment, the metal matrix composite forming axle carrier 24 may also include an amount of reinforcing material such as Silicon Carbide (SiC). In accordance with an aspect of an exemplary embodiment, the amount of SiC may be between about 25% and about 38%. In accordance with another aspect of an exemplary embodiment, the amount of SiC may be about 38%. Of course, it should be understood that the type and amount of reinforcing material may vary depending on the material employed to form gear carrier 80 so as to ensure that the CTE of gear carrier 80 and the CTE of axle carrier 24 are substantially equal to one another.

The term "about" is intended to include the degree of error associated with measurement of the particular quantity based upon the equipment available at the time of filing the application. For example, "about" can include a range of ±8% or 5%, or 2% of a given value.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An axle carrier comprising:
   a housing including an outer surface, an inner surface defining an interior portion, a first axle support member, and a second axle support member, the housing being formed from a first material; and
   a gear carrier arranged within the interior portion, the gear carrier being formed from a second material comprising iron (Fe), wherein the first material comprises a metal matrix composite having a coefficient of thermal expansion (CTE) that substantially matches a CTE of the second material.

2. The axle carrier according to claim 1, wherein the metal matrix composite includes aluminum and an amount of reinforcing material.

3. The axle carrier according to claim 2, wherein the amount of reinforcing material comprises Silicon Carbide (SiC).

4. The axle carrier according to claim 2, wherein the amount of reinforcing material is between about 25% and about 38% of the metal matrix composite.

5. The axle carrier according to claim 4, wherein the amount of reinforcing material is about 38% of the metal matrix composite.

6. The axle carrier according to claim 1, further comprising: a first bearing arranged at the first axle support member and a second bearing arranged at the second axle support member, each of the first and second bearings supporting the gear carrier and being mounted in the housing without an applied pre-load.

7. The axle carrier according to claim 6, further comprising: a first axle extending through the first axle support member and the first bearing and a second axle extending through the second axle support member and the second bearing.

8. The axle carrier according to claim 1, further comprising: a ring gear mounted to the gear carrier and a differential gear set arranged within the gear carrier.

9. A vehicle comprising:
   a chassis;
   a body supported by the chassis;
   a power source arranged in the body and supported by the chassis;
   a transmission operatively coupled to the power source and supported by the chassis; and
   an axle carrier operatively connected to the transmission through a drive shaft, the axle carrier comprising:
   a housing including an outer surface, an inner surface defining an interior portion, a first axle support member, and a second axle support member, the housing being formed from a first material; and
   a gear carrier arranged within the interior portion, the gear carrier being formed from a second material comprising iron (Fe), wherein the first material comprises a metal matrix composite having a coefficient of thermal expansion (CTE) that substantially matches a CTE of the second material.

10. The vehicle according to claim 9, wherein the metal matrix composite includes aluminum and an amount of reinforcing material.

11. The vehicle according to claim 10, wherein the amount of reinforcing material comprises Silicon Carbide (SiC).

12. The vehicle according to claim 10, wherein the amount of reinforcing material is between about 25% and about 38% of the metal matrix composite.

13. The vehicle according to claim 12, wherein the amount of reinforcing material is about 38% of the metal matrix composite.

14. The vehicle according to claim 9, further comprising: a first bearing arranged at the first axle support member and a second bearing arranged at the second axle support member, each of the first and second bearings supporting the gear carrier and being mounted in the housing without an applied pre-load.

15. The vehicle according to claim 14, further comprising: a first axle extending through the first axle support member and the first bearing and a second axle extending through the second axle support member and the second bearing.

16. The vehicle according to claim 9, further comprising: a ring gear mounted to the gear carrier and a differential gear set arranged within the gear carrier.

\* \* \* \* \*